United States Patent
Seregin et al.

(10) Patent No.: US 10,721,478 B2
(45) Date of Patent: Jul. 21, 2020

(54) PREDICTION MODE INFORMATION UPSAMPLING FOR SCALABLE VIDEO CODING

(71) Applicant: QUALCOMM Incorporated, San Diego, CA (US)

(72) Inventors: Vadim Seregin, San Diego, CA (US); Jianle Chen, San Diego, CA (US); Xiang Li, San Diego, CA (US); Krishnakanth Rapaka, San Diego, CA (US); Marta Karczewicz, San Diego, CA (US); Ying Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/585,918

(22) Filed: May 3, 2017

(65) Prior Publication Data

US 2017/0237990 A1  Aug. 17, 2017

Related U.S. Application Data

(63) Continuation of application No. 14/035,129, filed on Sep. 24, 2013, now abandoned.
(Continued)

(51) Int. Cl.
*H04N 19/00* (2014.01)
*H04N 19/159* (2014.01)
(Continued)

(52) U.S. Cl.
CPC ......... *H04N 19/159* (2014.11); *H04N 19/176* (2014.11); *H04N 19/33* (2014.11);
(Continued)

(58) Field of Classification Search
CPC ...... H04N 11/02; H04N 19/52; H04N 19/503; H04N 19/513; H04N 19/33; H04N 19/593; H04N 19/59; H04N 19/30; H04N 19/587
See application file for complete search history.

(56) References Cited

U.S. PATENT DOCUMENTS 5,790,839 A * 8/1998 Luk .......................... G11C 5/14
                                                          713/300
5,901,304 A * 5/1999 Hwang ............... G06F 13/1689
                                                          711/105
(Continued)

FOREIGN PATENT DOCUMENTS

CN    101213840 A    7/2008
JP    2008530926 A   8/2008
(Continued)

OTHER PUBLICATIONS

Misra et al. ("Scalable extensions of HEVC for next generation services," Proc. SPIE 8666, Visual Information Processing and Communication IV, 866607 (Feb. 21, 2013).*
(Continued)

*Primary Examiner* — Frank F Huang
(74) *Attorney, Agent, or Firm* — Shumaker & Sieffert, P.A.

(57) ABSTRACT

In one embodiment, an apparatus configured to code video data includes a processor and a memory unit. The memory unit stores video data associated with a first layer having a first spatial resolution and a second layer having a second spatial resolution. The video data associated with the first layer includes at least a first layer block and first layer prediction mode information associated with the first layer block, and the first layer block includes a plurality of sub-blocks where each sub-block is associated with respective prediction mode data of the first layer prediction mode
(Continued)

information. The processor derives the predication mode data associated with one of the plurality of sub-blocks based at least on a selection rule, upsamples the derived prediction mode data and the first layer block, and associates the upsampled prediction mode data with each upsampled sub-block of the upsampled first layer block.

22 Claims, 7 Drawing Sheets

Related U.S. Application Data

(60) Provisional application No. 61/710,640, filed on Oct. 5, 2012, provisional application No. 61/711,704, filed on Oct. 9, 2012, provisional application No. 61/728,193, filed on Nov. 19, 2012.

(51) Int. Cl.
*H04N 19/463* (2014.01)
*H04N 19/33* (2014.01)
*H04N 19/52* (2014.01)
*H04N 19/517* (2014.01)
*H04N 19/176* (2014.01)

(52) U.S. Cl.
CPC ......... *H04N 19/463* (2014.11); *H04N 19/517* (2014.11); *H04N 19/52* (2014.11)

(56) References Cited

U.S. PATENT DOCUMENTS

| | | | | |
|---|---|---|---|---|
| 6,072,834 | A * | 6/2000 | Kim | H04N 19/176 348/384.1 |
| 6,097,756 | A * | 8/2000 | Han | G06T 9/20 348/699 |
| 6,580,754 | B1 * | 6/2003 | Wan | H04N 21/234327 375/240.01 |
| 6,728,317 | B1 * | 4/2004 | Demos | H04N 5/14 348/E5.108 |
| 6,765,962 | B1 * | 7/2004 | Lee | H04N 19/197 375/240.03 |
| 6,771,703 | B1 * | 8/2004 | Oguz | G11B 27/034 375/240.03 |
| 6,826,232 | B2 * | 11/2004 | Chen | H04N 19/176 375/240.11 |
| 7,016,412 | B1 * | 3/2006 | van Zon | H04N 19/61 375/240.1 |
| 7,095,782 | B1 * | 8/2006 | Cohen | H04N 21/234327 348/410.1 |
| 7,245,662 | B2 * | 7/2007 | Piche | H04N 19/46 375/240.2 |
| 7,263,124 | B2 * | 8/2007 | Peng | H04N 19/126 375/240.03 |
| 7,369,610 | B2 * | 5/2008 | Xu | H04N 21/2662 375/240.08 |
| 7,391,807 | B2 * | 6/2008 | Lin | H04N 19/61 375/240.03 |
| 7,477,688 | B1 * | 1/2009 | Zhang | H04N 19/159 375/240 |
| 7,627,034 | B2 * | 12/2009 | Park | H04N 19/105 375/240.08 |
| 7,697,608 | B2 * | 4/2010 | Lee | H04N 19/14 375/240.02 |
| 7,729,421 | B2 * | 6/2010 | Campisano | H04N 21/4307 375/240.01 |
| 7,813,428 | B2 | 10/2010 | Yoon et al. | |
| 8,040,952 | B2 * | 10/2011 | Park | H04N 21/21805 375/240.01 |
| 8,189,659 | B2 * | 5/2012 | Han | H04L 1/0007 375/240.02 |
| 8,199,812 | B2 | 6/2012 | Ye et al. | |
| 8,428,129 | B2 | 4/2013 | Wu et al. | |
| 8,451,899 | B2 | 5/2013 | Park et al. | |
| 8,494,042 | B2 * | 7/2013 | Park | H04N 19/103 345/530 |
| 2007/0064791 | A1 * | 3/2007 | Okada | H04N 19/52 375/240.1 |
| 2009/0028245 | A1 * | 1/2009 | Vieron | H04N 19/105 375/240.16 |
| 2011/0243231 | A1 * | 10/2011 | Li | H04N 19/00672 375/240.16 |
| 2011/0268175 | A1 * | 11/2011 | Tan | H04N 19/105 375/240.01 |
| 2013/0028324 | A1 * | 1/2013 | Chang | H04N 19/30 375/240.16 |
| 2013/0188719 | A1 | 7/2013 | Chen et al. | |
| 2014/0092970 | A1 * | 4/2014 | Misra | H04N 19/52 375/240.16 |
| 2014/0098880 | A1 | 4/2014 | Seregin et al. | |

FOREIGN PATENT DOCUMENTS

| | | |
|---|---|---|
| JP | 2008530927 A | 8/2008 |
| KR | 20070103459 A | 10/2007 |
| WO | 2006087314 A1 | 8/2006 |
| WO | WO-2006087319 A2 | 8/2006 |

OTHER PUBLICATIONS

Chen J., et al., "Description of Scalable Video coding Technology Proposal by Qualcomm (Configuration 2)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/,, No. JCTVC-K0036, Oct. 2, 2012 (Oct. 2, 2012), XP030112968, pp. 1-22.

International Search Report and Written Opinion—PCT/US2013/062001—ISA/EPO—dated Jan. 16, 2014.

Kang J. W. et al., "Description of scalable video coding technology proposal by ETRI and Kwangwoon Univ", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/ No. JCTVC-K0037, Oct. 1, 2012 (Oct. 1, 2012), XP030112969, pp. 1-20.

Kawamura K., et al., "SCE5: Results of test 5.1.4 on inter-layer motion-vector prediction by the base-layer MV up-scaling and refinement using HEVC base layer", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16 ); URL: http://wftp3.itu.int/av-arch/jctvc-site/ No. JCTVC-M0413, Apr. 17, 2013 (Apr. 17, 2013), XP030114370, pp. 1-4.

Schwarz et al., "Further experiments for an MCTF extension of H.264", 23. VCEG Meeting; 69. MPEG Meeting; Jul. 17, 2004-Jul. 23, 2004; Redmond, WA, US; (Video Coding Experts Group of ITU-TSG.16), No. VCEG-W06, Jul. 15, 2004 (Jul. 15, 2004), XP030003415, ISSN: 0000-0454 figure 4 section 2 .1.1 "Inter-layer prediction of motion data"; pp. 1-7.

Schwarz H., et al., "Description of Scalable Video Coding Technology Proposal by Fraunhofer HHI (Configuration A)", 11. JVT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/no.jvtcv-k0042, Oct. 2, 2012 (Oct. 2, 2012), XP030112974, pp. 1-37.

Wiegand T., et al., "Suggested Design of Initial Software Model for Scalable HEVC Extension Proposal by Fraunhofer HHI; Vidyo and Samsung", 102. MPEG Meeting; Oct. 15, 2012-Oct. 19, 2012; Shanghai; (Motion Picture Expert Group or ISO/IEC JTC1/SC29/WG11) No. m27113, Oct. 18, 2012 (Oct. 18, 2012), XP030055424, pp. 1-22.

Misra K. et al., "Description of Scalable Video Coding Technology Proposal by Sharp (Proposal 1)", JCTVC-K0031, Oct. 2012, pp.

(56) References Cited

OTHER PUBLICATIONS 1-36, URL: http://phenix.it-sudparis.eu/jct/doc_end_user/documents/11_Shanghai/wg11/JCTVC-K0031-v1.zip.

Chen et al., "Non-TE5: on motion mapping in SHVC," Joint Collaborative Team on Video Coding (JCT-VC) of ITU-T SG 16 WP 3 and ISO/IEC JTC 1/SC 29/WG 11, 12th Meeting; Jan. 14-23, 2013, No. JCTVC-L0336, 2 pp.

Seregin, et al., "Description of Tool Experiment C5: Inter-layer syntax prediction using HEVC base layer," Joint Collaborative Team on Video Coding (JCT-VC) of ITU-T SG 16 WP 3 and ISO/IEC JTC 1/SC 29/WG 11, 11th Meeting, Oct. 10-19, 2012, No. JCTVC-K1105, 14 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

International Preliminary Report on Patentability—PCT/US2013/062001, The International Bureau of WIPO—Geneva, Switzerland, dated Jan. 9, 2015, 22 pp.

\* cited by examiner

PREDICTION MODE INFORMATION UPSAMPLING FOR SCALABLE VIDEO CODING

CROSS REFERENCE TO RELATED APPLICATIONS

This application is a continuation of U.S. patent application Ser. No. 14/035,129, filed on Sep. 24, 2013, which claims benefit to U.S. Provisional Patent Application No. 61/710,640 entitled "MOTION UPSAMPLING FOR SVC" filed on Oct. 5, 2012, U.S. Provisional Patent Application No. 61/711,704 entitled "MOTION UPSAMPLING FOR SCALABLE VIDEO CODING" filed on Oct. 9, 2012, and U.S. Provisional Patent Application No. 61/728,193 entitled "MOTION UPSAMPLING FOR SVC" filed on Nov. 19, 2012; the disclosures of these applications are hereby incorporated by reference in their entirety.

TECHNICAL FIELD

This disclosure generally relates to video coding and compression.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC), and extensions of such standards. The video devices may transmit, receive, encode, decode, and/or store digital video information more efficiently by implemented such video coding techniques.

A digital image, such as a video image, a TV image, a still image or an image generated by a video recorder, or a computer, may consist of pixels arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it may render real-time image transmission difficult. To reduce the amount of information to be transmitted, a number of different compression methods have been developed.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data.

Block-based video coding and compression can further make use of scalable techniques. Scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or SNR levels.

SUMMARY

For purposes of summarizing the disclosure, certain aspects, advantages and novel features have been described herein. It is to be understood that not necessarily all such advantages can be achieved in accordance with any particular embodiment disclosed herein. Thus, the features disclosed herein can be embodied or carried out in a manner that achieves or optimizes one advantage or group of advantages as taught herein without necessarily achieving other advantages as can be taught or suggested herein.

In accordance with some embodiments, an apparatus configured to code video data includes a memory unit and a processor. The memory unit is configured to store video data associated with a first layer having a first spatial resolution and a second layer having a second spatial resolution different than the first spatial resolution. The video data associated with the first layer includes at least a first layer block and first layer prediction mode information associated with the first layer block, and the first layer block includes a plurality of sub-blocks where each sub-block is associated with respective prediction mode data of the first layer prediction mode information. The processor is in communication with the memory unit, and the processor is configured to derive the predication mode data associated with one of the plurality of sub-blocks based at least on a selection rule, upsample the derived prediction mode data and the first layer block, and associate the upsampled prediction mode data with each upsampled sub-block of the upsampled first layer block.

The apparatus of the previous paragraph can include one or more of the following features: According to the selection rule, the processor is configured to select the prediction mode data associated with a first sub-block of the plurality of sub-blocks based at least on a location of the first sub-block relative to one or more other sub-blocks of the first layer block. The first sub-block is a center sub-block neighbored on each side by one of the plurality of sub-blocks of the first layer block. The processor is configured to determine the selection rule according to a signal flag. The processor is configured to determine a predicted value of a second layer block in the second layer based at least on the upsampled first layer block and the upsampled prediction mode data associated with each upsampled sub-block of the upsampled first layer block. The first layer block is located at a position in the first layer corresponding to the position of the second layer block in the second layer, or the first layer block is located at the position in the first layer corresponding to the position of a neighboring second layer block positioned adjacent to the second layer block in the second layer. The respective prediction mode data associated with each sub-block of the first layer block includes a motion vector. A spatial resolution ratio between the upsampled prediction mode data and the derived prediction mode data matches the spatial resolution ratio between the second spatial resolution and the first spatial resolution. The processor is configured to: associate the upsampled prediction mode data with each upsampled sub-block of the upsampled first layer block when a first coder-decoder (codec) is used to compress the first layer block; and associate assigned prediction mode data with each upsampled sub-block of the upsampled first layer block based at least on an assignment rule when a second codec different from the first codec is used to compress the video unit in the first layer. According to the assignment rule, the processor is configured to assign the prediction mode data to be at least one of a zero motion vector, a reference index equal to zero, a reference index equal to minus one, and a motion field marked as unavailable. The processor is configured to insert the upsampled first layer block in a reference list. The processor comprises a decoder. The processor comprises an encoder. The apparatus is part of a device, the device selected from the group consisting of a computer and a wireless communication device handset.

In accordance with some embodiments, a method of coding video data includes: storing video data associated with a first layer having a first spatial resolution and a second layer having a second spatial resolution different than the first spatial resolution, the video data associated with the first layer including at least a first layer block and first layer prediction mode information associated with the first layer block, the first layer block including a plurality of sub-blocks where each sub-block is associated with respective prediction mode data of the first layer prediction mode information; deriving the predication mode data associated with one of the plurality of sub-blocks based at least on a selection rule; upsampling the derived prediction mode data and the first layer block; and associating the upsampled prediction mode data with each upsampled sub-block of the upsampled first layer block.

The method of the previous paragraph can include one or more of the following features: According to the selection rule, said deriving includes deriving the prediction mode data associated with a first sub-block of the plurality of sub-blocks based at least on a location of the first sub-block relative to one or more other sub-blocks of the first layer block. The first sub-block is a center sub-block neighbored on each side by one of the plurality of sub-blocks of the first layer block. The method further includes determining the selection rule according to a signal flag. The method further includes determining a predicted value of a second layer block in the second layer based at least on the upsampled first layer block and the upsampled prediction mode data associated with each upsampled sub-block of the upsampled first layer block, wherein the first layer block is located at a position in the first layer corresponding to the position of the second layer block in the second layer, or the first layer block is located at the position in the first layer corresponding to the position of a neighboring second layer block positioned adjacent to the second layer block in the second layer. The respective prediction mode data associated with each sub-block of the first layer block includes a motion vector. A spatial resolution ratio between the upsampled prediction mode data and the derived prediction mode data matches the spatial resolution ratio between the second spatial resolution and the first spatial resolution. The method further includes: associating the upsampled prediction mode data with each upsampled sub-block of the upsampled first layer block when a first coder-decoder (codec) is used to compress the first layer block; and associating assigned prediction mode data with each upsampled sub-block of the upsampled first layer block based at least on an assignment rule when a second codec different from the first codec is used to compress the video unit in the first layer. The method further includes assigning, according to the assignment rule, the prediction mode data to be at least one of a zero motion vector, a reference index equal to zero, a reference index equal to minus one, and a motion field marked as unavailable. The method further includes inserting the upsampled first layer block in a reference list. The method further includes receiving a syntax element extracted from an encoded video bit stream, the syntax element indicative of the prediction mode information associated with the first layer video block. The method further includes generating a syntax element for an encoded video bit stream, the syntax element indicative of the prediction mode information associated with the first layer video block.

In accordance with some embodiments, an apparatus configured to code video data includes: means for storing video data associated with a first layer having a first spatial resolution and a second layer having a second spatial resolution different than the first spatial resolution, the video data associated with the first layer including at least a first layer block and first layer prediction mode information associated with the first layer block, the first layer block including a plurality of sub-blocks where each sub-block is associated with respective prediction mode data of the first layer prediction mode information; means for deriving the predication mode data associated with one of the plurality of sub-blocks based at least on a selection rule; means for upsampling the derived prediction mode data and the first layer block; and means for associating the upsampled prediction mode data with each upsampled sub-block of the upsampled first layer block.

In accordance with some embodiments, a non-transitory computer storage that stores executable program instructions that direct an apparatus for coding video data to perform a process that includes: storing video data associated with a first layer having a first spatial resolution and a second layer having a second spatial resolution different than the first spatial resolution, the video data associated with the first layer including at least a first layer block and first layer prediction mode information associated with the first layer block, the first layer block including a plurality of sub-blocks where each sub-block is associated with respective prediction mode data of the first layer prediction mode information; deriving the predication mode data associated with one of the plurality of sub-blocks based at least on a selection rule; upsampling the derived prediction mode data and the first layer block; and associating the upsampled prediction mode data with each upsampled sub-block of the upsampled first layer block.

BRIEF DESCRIPTION OF DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

DETAILED DESCRIPTION

Overview

Figure 1:
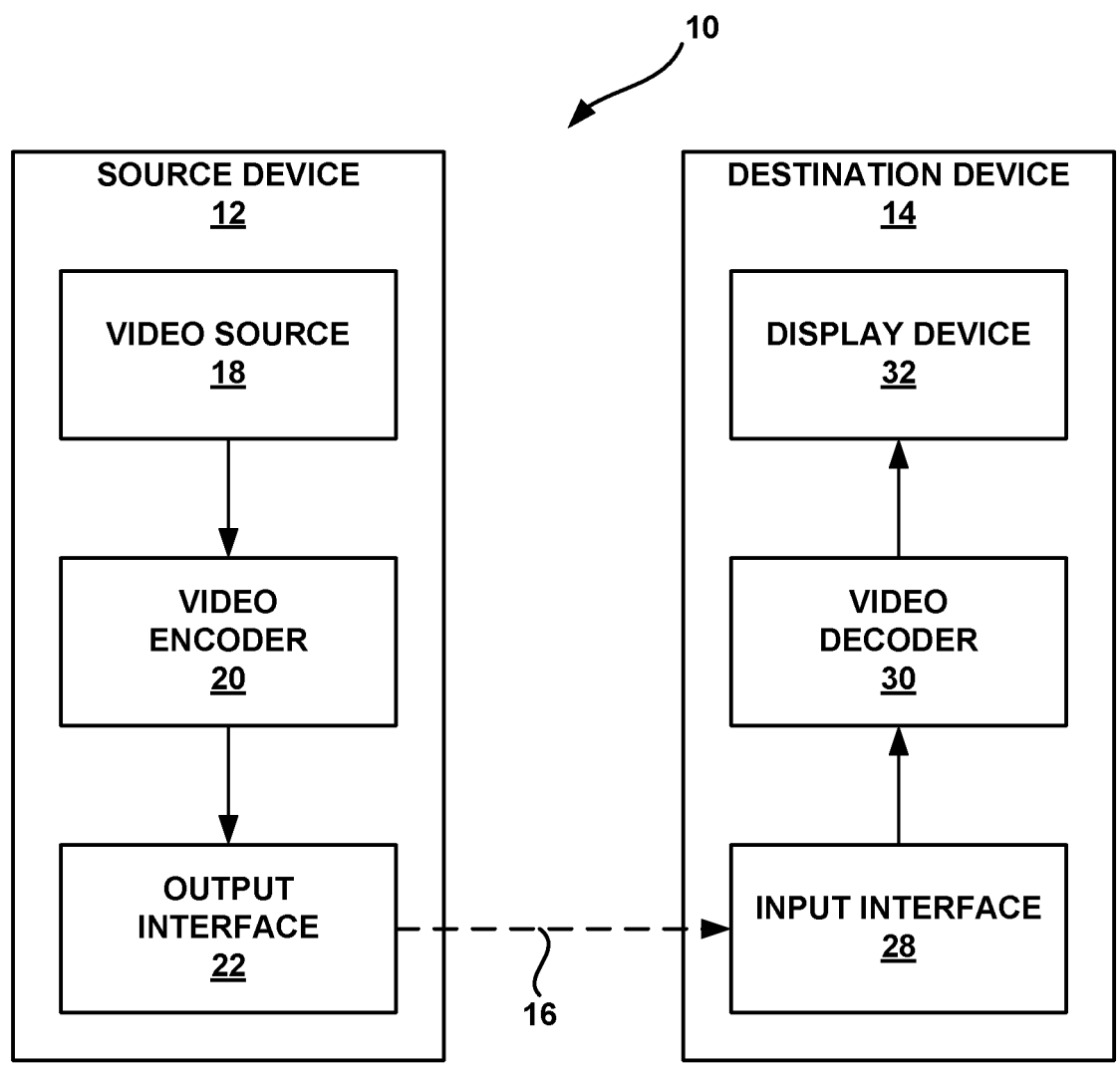
FIG. 1 is a block diagram illustrating an example video coding system that may utilize the techniques described in this disclosure.

The techniques described in this disclosure generally relate to scalable video coding (SVC), scalable video high efficiency video coding (SHVC), multi-view coding, and 3D video coding. For example, the techniques may be related to, and used with or within, a High Efficiency Video Coding (HEVC) SVC extension. In an SVC extension, there could be multiple layers of video information. The layer at the very bottom level may serve as a base layer (BL), and the layer at the very top may serve as an enhanced layer (EL). In MVC, the term "view" may be used in place of the term "layer." Accordingly, references in this disclosure to "layer" or "layers" may be substituted with "view" or "views," respectively. The "enhanced layer" is sometimes referred to as an "enhancement layer," and these terms may be used interchangeably. The layers in the middle may serve as either or both enhancement layers or base layers. For example, a layer in the middle may be an enhancement layer for the layers below it, such as the base layer or any intervening enhancement layers, and at the same time serve as a base layer for the enhancement layers above it.

SVC may be used to provide quality (also referred to as signal-to-noise (SNR)) scalability, spatial scalability, and/or temporal scalability. An enhancement layer may have the same or a different spatial resolution than base layer. For example, the spatial aspect ratio between an enhancement layer and base layer can be 1.0, 1.5, 2.0, or other different ratios. In other words, the spatial aspect of the enhancement layer may equal 1.0, 1.5, or 2.0 times the spatial aspect of the base layer. In some examples, the scaling factor of the enhancement layer may be greater than the base layer. For example, a size of pictures in the enhancement layer may be greater than a size of pictures in the base layer. In this way, it may be possible, although not a limitation, that the spatial resolution of the enhancement layer is greater than the spatial resolution of the base layer.

Upsample filtering, sometimes referred to as resample filtering, may be applied to a base layer in order to increase the spatial resolution of the base layer. In some implementations, a spatial resolution of the base layer can be increased to match the spatial resolution of an enhancement layer. This process may be called spatial scalability. An upsampling filter set can be applied to the base layer, and one filter can be chosen from the set based on a phase (sometimes referred to as a fractional pixel shift). The phase may be calculated based on the spatial aspect ratio between base layer and enhancement layer pictures.

SVC additionally facilitates inter-layer motion prediction where motion of a base layer is used to predict motion in the enhancement layer. Motion information like a motion vector, a reference index, or an inter direction associated with one or more video blocks of a base layer can be used to determine motion information associated with one or more video blocks of an enhancement layer. For example, a motion vector of a co-located block in the base layer picture may be used as a candidate to predict a motion vector of a predicted video unit in an enhancement layer when a base layer picture is listed as a co-located picture in a reference picture list.

However, in some cases, if the spatial resolution of an enhancement layer is different than the spatial resolution of a base layer, inter-layer motion prediction may not be enabled since the motion information associated with the video blocks of the base layer may not be accessible for inter-layer motion prediction without implementing changes to a base layer system design below the slice level or using different hardware or software system designs. As a result, the ability of a video coder to compress video data may be reduced where the spatial resolution of the enhancement layer is different than the spatial resolution of the base layer.

Advantageously, embodiments of this disclosure are directed in part to upsampling prediction mode information, sometimes known as non-pixel information, (e.g., intra prediction mode, inter prediction mode, or motion information such as a motion vector, a reference index, or an inter direction that is usable for compressing video data) of a base layer so that the upsampled prediction mode information can be used in inter-layer motion prediction for an enhancement layer. The approaches of this disclosure can facilitate inter-layer motion prediction without implementing coding unit or low level system changes when the enhancement layer has a different or greater spatial resolution than the base layer. In one example, prediction mode information associated with a base layer block is upsampled, and some or all of the upsampled prediction mode information, in turn, may be used to determine predicted prediction mode information for an enhancement layer block. Furthermore, in certain embodiments, default prediction mode information can be beneficially used as a candidate to determine predicted prediction mode information for an enhancement layer block.

For purposes of illustration only, the techniques described in the disclosure may be described with examples including only two layers (e.g., lower level layer such as a base layer, and a higher level layer such as an enhancement layer). It should be understood, however, that the examples described in this disclosure can be extended to examples with multiple base layers and enhancement layers as well.

Video Coding System

FIG. 1 is a block diagram that illustrates an example video coding system 10 that may utilize techniques in accordance with aspects described in this disclosure. As used described herein, the term "video coder" refers generically to both video encoders and video decoders. The terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. The syntax elements may describe characteristics and/or processing of blocks and other coded units, e.g., GOPs. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the HEVC standard, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263. Two or more standards (e.g., HEVC and H.264/AVC) moreover may be used together or in combination, in some cases. For instance, H.264/AVC or another combined encoder/decoder (codec) may be used for base layer compression, and enhancement layer compression may use HEVC.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a codec in a respective device. A device including video encoder 20 and/or video decoder 30 may comprise an integrated circuit, a microprocessor, and/or a wireless communication device, such as a cellular telephone.

Video Encoder

Figure 2:
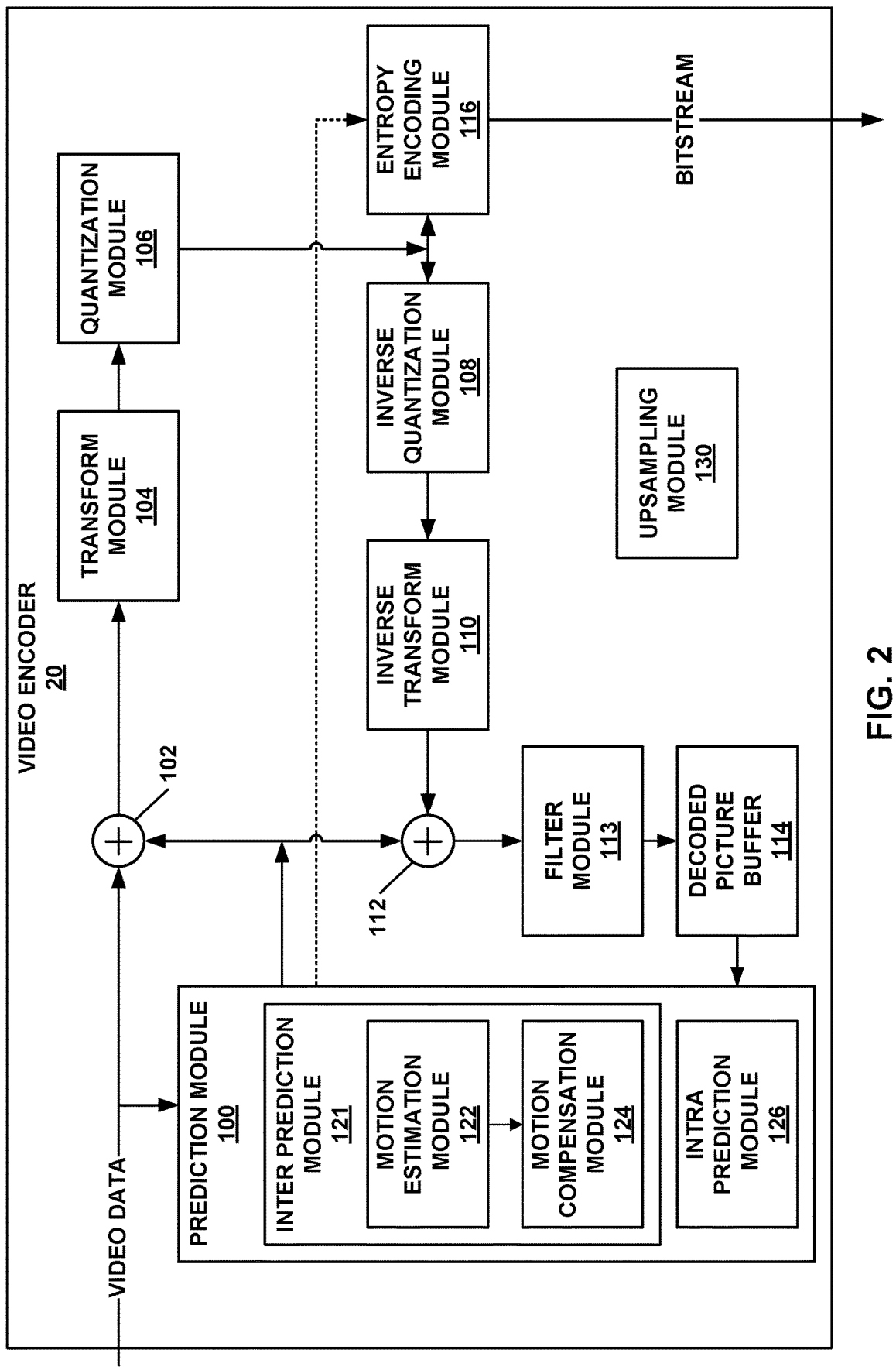
FIG. 2 is a block diagram illustrating an example video encoder that may implement embodiments of this disclosure.

FIG. 2 is a block diagram that illustrates an example video encoder 20 that can implement any or all techniques in accordance with aspects described in this disclosure. As one example, inter prediction module 121 and upsampling module 130 may perform any or all of the techniques described in this disclosure. However, aspects of this disclosure are not so limited. In some examples, the techniques may be shared among the various components of video encoder 20. In some examples, in addition to or instead of, a processor (not shown) may be configured to perform any or all of the techniques described in this disclosure.

Video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, an entropy encoding module 116, and an upsampling module 130. Prediction module 100 includes an inter prediction module 121, motion estimation module 122, a motion compensation module 124, and an intra prediction module 126. In other examples, video encoder 20 may include more, fewer, or different functional components. Furthermore, motion estimation module 122 and motion compensation module 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of video frames or pictures, such as a group of pictures (GOP). A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

A video frame or picture may be further divided into a sequence of treeblocks or largest coding units (LCU) that include both luma and chroma samples (sometimes referred to as pixels). Syntax data within a bitstream may define a size for the LCU, which is a largest coding unit in terms of the number of samples. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction module 100 may partition the video block of the CU among one or more prediction units (PUs) of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction module 100 may perform geometric partitioning to partition the video block of a CU among PUs of the CU along a boundary that does not meet the sides of the video block of the CU at right angles.

Inter prediction module 121 may perform inter prediction on each PU of the CU. Inter prediction may provide temporal compression. To perform inter prediction on a PU, motion estimation module 122 may generate motion information for the PU. Motion compensation module 124 may generate a predicted video block for the PU based the motion information and decoded samples of pictures other than the picture associated with the CU (i.e., reference pictures). In this disclosure, a predicted video block generated by motion compensation module 124 may be referred to as an inter-predicted video block.

Slices may be I slices, P slices, or B slices. Motion estimation module 122 and motion compensation module 124 may perform different operations for a PU of a CU depending on whether the PU is in an I slice, a P slice, or a B slice. In an I slice, all PUs are intra predicted. Hence, if the PU is in an I slice, motion estimation module 122 and motion compensation module 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation module 122 performs the motion estimation operation with regard to a PU in a P slice, motion estimation module 122 may search the reference pictures in list 0 for a reference block for the PU. The reference block of the PU may be a set of samples, e.g., a block of samples, that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation module 122 may generate a reference index that indicates the reference picture in list 0 containing the reference block and a motion vector that indicates a spatial displacement between the PU and the reference block. In various examples, motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference block values may be interpolated from integer-position sample values in the reference picture. Motion estimation module 122 may output the reference index and the motion vector as the motion information of the PU. Motion compensation module 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation module 122 may perform uni-directional prediction or bi-directional prediction for the PU. When motion estimation module 122 performs uni-directional prediction for the PU, motion estimation module 122 may search the reference pictures of list 0 or list 1 for a reference block for the PU. Motion estimation module 122 may then generate a reference index that indicates the reference picture in list 0 or list 1 that contains the reference block and a motion vector that indicates a spatial displacement between the PU and the reference block. Motion estimation module 122 may output the reference index, a prediction direction indicator, and the motion vector as the motion information of the PU. The prediction direction indicator may indicate whether the reference index indicates a reference picture in list 0 or list 1. Motion compensation module 124 may generate the predicted video block of the PU based on the reference block indicated by the motion information of the PU.

When motion estimation module 122 performs bi-directional prediction for a PU, motion estimation module 122 may search the reference pictures in list 0 for a reference block for the PU and may also search the reference pictures in list 1 for another reference block for the PU. Motion estimation module 122 may then generate reference indexes that indicate the reference pictures in list 0 and list 1 containing the reference blocks and motion vectors that indicate spatial displacements between the reference blocks and the PU. Motion estimation module 122 may output the reference indexes and the motion vectors of the PU as the motion information of the PU. Motion compensation module 124 may generate the predicted video block of the PU based on the reference blocks indicated by the motion information of the PU.

In some instances, motion estimation module 122 does not output a full set of motion information for a PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a syntax structure associated with the PU, a value that indicates to video decoder 30 that the PU has the same motion information as the neighboring PU. In another example, motion estimation module 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predicted video block and various syntax elements. Intra prediction module 126 may perform intra prediction on PUs in I slices, P slices, and B slices.

To perform intra prediction on a PU, intra prediction module 126 may use multiple intra prediction mode directions or intra prediction directions to generate multiple sets of prediction data for the PU. When intra prediction module 126 uses an intra prediction direction to generate a set of prediction data for the PU, intra prediction module 126 may extend samples from video blocks of neighboring PUs across the video block of the PU in a direction and/or gradient associated with the intra prediction direction. The neighboring PUs may be above, above and to the right, above and to the left, or to the left of the PU, assuming a left-to-right, top-to-bottom encoding order for PUs, CUs, and treeblocks. Intra prediction module 126 may use various numbers of intra prediction directions (e.g., 33 intra prediction directions), depending on the size of the PU.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal a direction of the intra prediction mode that was used to generate the prediction data for the PUs (e.g., the selected intra prediction direction). Prediction module 100 may signal the selected intra prediction direction in various ways. For example, it is probable the selected intra prediction direction is the same as the intra prediction direction of a neighboring PU. In other words, the intra prediction direction of the neighboring PU may be the most probable mode for the current PU. Thus, prediction module 100 may generate a syntax element to indicate that the selected intra prediction direction is the same as the intra prediction direction of the neighboring PU.

After prediction module 100 selects the prediction data for PUs of a CU, residual generation module 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 104 may generate one or more transform coefficient blocks for each TU of a CU by applying one or more transforms to a residual video block associated with the TU. Each of the transform coefficient blocks may be a 2D matrix of transform coefficients. Transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to corresponding samples from one or more predicted video blocks generated by prediction module 100 to produce a reconstructed video block associated with a TU. By reconstructing video blocks for each TU of a CU in this way, video encoder 20 may reconstruct the video block of the CU.

After reconstruction module 112 reconstructs the video block of a CU, filter module 113 may perform a deblocking operation to reduce blocking artifacts in the video block associated with the CU. After performing the one or more deblocking operations, filter module 113 may store the reconstructed video block of the CU in decoded picture buffer 114. Motion estimation module 122 and motion compensation module 124 may use a reference picture that contains the reconstructed video block to perform inter prediction on PUs of subsequent pictures. In addition, intra prediction module 126 may use reconstructed video blocks in decoded picture buffer 114 to perform intra prediction on other PUs in the same picture as the CU.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

Upsampling module 130 can scale or resample video data, including pixel and non-pixel information like prediction mode information, to increase the spatial resolution. In some embodiments, the video data of a base layer can be upsampled to match the spatial resolution of an enhancement layer. Upsampling module 130 can also coordinate with one or more other functional components of the video encoder 20 to upsample the base layer video data of a base layer picture before the base layer picture is inserted into a reference list.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video Decoder

Figure 3:
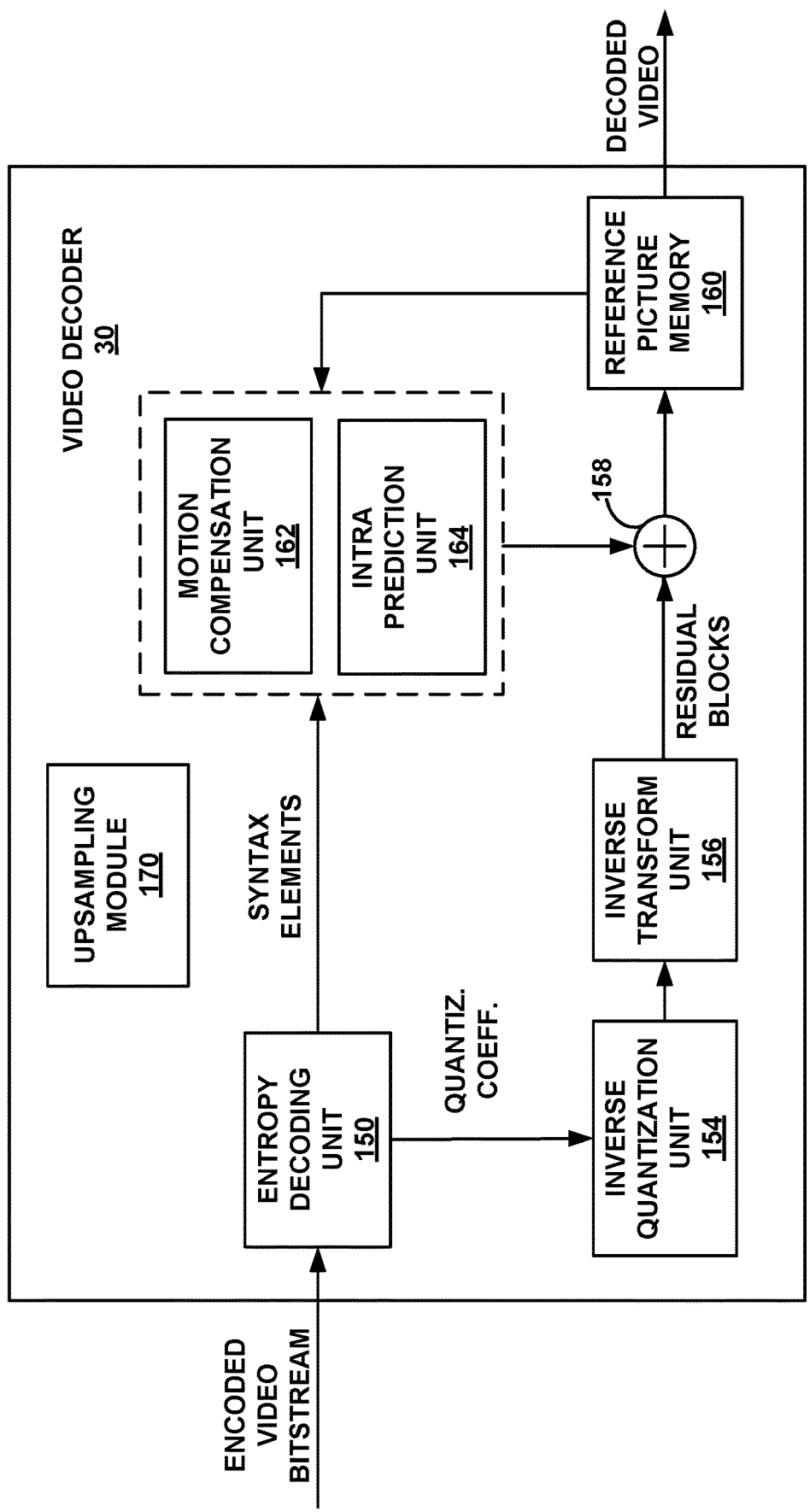
FIG. 3 is a block diagram illustrating an example video decoder that may implement embodiments of this disclosure.

FIG. 3 is a block diagram illustrating an example of a video decoder that may implement techniques in accordance with aspects described in this disclosure. Video decoder 30 may perform any or all of the techniques of this disclosure. As one example, motion compensation unit 162 and upsampling module 170 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

Video decoder 30 includes an entropy decoding unit 150, motion compensation unit 162, intra prediction unit 164, inverse quantization unit 154, inverse transformation unit 156, reference picture memory 160 and summer 158. Video decoder 30 may, in some examples, perform a decoding pass generally reciprocal to the encoding pass described with respect to video encoder 20 (FIG. 2). Motion compensation unit 162 may generate prediction data based on motion vectors received from entropy decoding unit 150, while intra-prediction unit 164 may generate prediction data based on intra-prediction mode indicators received from entropy decoding unit 150.

During the decoding process, video decoder 30 receives an encoded video bitstream that represents video blocks of an encoded video slice and associated syntax elements from video encoder 20. Entropy decoding unit 150 of video decoder 30 entropy decodes the bitstream to generate quantized coefficients, motion vectors or intra-prediction mode indicators, and other syntax elements. Entropy decoding unit 150 forwards the motion vectors to and other syntax elements to motion compensation unit 162. Video decoder 30 may receive the syntax elements at the video slice level and/or the video block level.

When the video slice is coded as an intra-coded (I) slice, intra prediction unit 164 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 162 produces predictive blocks for a video block of the current video slice based on the motion vectors and other syntax elements received from entropy decoding unit 150. The predictive blocks may be produced from one of the reference pictures within one of the reference picture lists. Video decoder 30 may construct the reference frame lists, list 0 and list 1, using default construction techniques based on reference pictures stored in reference picture memory 160. Motion compensation unit 162 determines prediction information for a video block of the current video slice by parsing the motion vectors and other syntax elements, and uses the prediction information to produce the predictive blocks for the current video block being decoded. For example, motion compensation unit 162 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Upsampling module 170 can scale or resample video data, including pixel and non-pixel information like prediction mode information, to increase the spatial resolution. In some embodiments, the video data of a base layer can be upsampled to match the spatial resolution of an enhancement layer. Upsampling module 130 can coordinate with one or more other functional components of the video encoder 20 to upsample the base layer video data of a base layer picture before the base layer picture is inserted into a reference list.

Motion compensation unit 162 may also perform interpolation based on interpolation filters. Motion compensation unit 162 may use interpolation filters as used by video encoder 20 during encoding of the video blocks to calculate interpolated values for sub-integer pixels of reference blocks. In this case, motion compensation unit 162 may determine the interpolation filters used by video encoder 20 from the received syntax elements and use the interpolation filters to produce predictive blocks.

Inverse quantization unit 154 inverse quantizes, e.g., de quantizes, the quantized transform coefficients provided in the bitstream and decoded by entropy decoding unit 150. The inverse quantization process may include use of a quantization parameter QPY calculated by video decoder 30 for each video block in the video slice to determine a degree of quantization and, likewise, a degree of inverse quantization that should be applied.

Inverse transform unit 156 applies an inverse transform, e.g., an inverse DCT, an inverse integer transform, or a conceptually similar inverse transform process, to the transform coefficients in order to produce residual blocks in the pixel domain.

After motion compensation unit 162 generates the predictive block for the current video block based on the motion vectors and other syntax elements, video decoder 30 forms a decoded video block by summing the residual blocks from inverse transform unit 156 with the corresponding predictive blocks generated by motion compensation unit 162. Summer 158 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 160, which stores reference pictures used for subsequent motion compensation. Reference picture memory 160 also stores decoded video for later presentation on a display device, such as display device 32 of FIG. 1.

In another embodiment, not shown, after the summer 158 reconstructs the video block of the CU, a filter module may perform a deblocking operation to reduce blocking artifacts associated with the CU. After the filter module performs a deblocking operation to reduce blocking artifacts associated with the CU, the video decoder 30 may store the video block of the CU in a decoded picture buffer. The decoded picture buffer may provide reference pictures for subsequent motion compensation, intra prediction, and presentation on a display device, such as display device 32 of FIG. 1. For instance, the video decoder 30 may perform, based on the video blocks in the decoded picture buffer, intra prediction or inter prediction operations on PUs of other CUs.

In a typical video encoder, the frame of the original video sequence is partitioned into rectangular regions or blocks, which are encoded in Intra-mode (I-mode) or Inter-mode (P-mode). The blocks are coded using some kind of transform coding, such as DCT coding. However, pure transform-based coding may only reduce the inter-pixel correlation within a particular block, without considering the inter-block correlation of pixels, and may still produce high bit-rates for transmission. Current digital image coding standards may also exploit certain methods that reduce the correlation of pixel values between blocks.

In general, blocks encoded in P-mode are predicted from one of the previously coded and transmitted frames. The prediction information of a block may be represented by a two-dimensional (2D) motion vector. For the blocks encoded in I-mode, the predicted block is formed using spatial prediction from already encoded neighboring blocks within the same frame. The prediction error (e.g., the difference between the block being encoded and the predicted block) may be represented as a set of weighted basis functions of some discrete transform. The prediction error may also be referred to as residual data. The transform is typically performed on an 8×8 or 4×4 block basis. The weights (e.g., transform coefficients) are subsequently quantized. Quantization introduces loss of information and, therefore, quantized coefficients have lower precision than the originals.

Quantized transform coefficients, together with motion vectors and some control information, may form a complete coded sequence representation and are referred to as syntax elements. Prior to transmission from the encoder to the decoder, all syntax elements may be entropy encoded so as to further reduce the number of bits needed for their representation.

In the decoder, the block in the current frame may be obtained by first constructing the block's prediction in the same manner as in the encoder and by adding to the prediction the compressed prediction error. The compressed prediction error may be found by weighting the transform basis functions using the quantized coefficients. The difference between the reconstructed frame and the original frame may be called reconstruction error.

Video Coding and Compression Embodiments

Inter-prediction in MVC can include both inter-picture prediction within each view and inter-view prediction (e.g., prediction between views). Inter-view prediction is supported in MVC using disparity motion compensation, which can apply the syntax of the H.264/AVC motion compensation, but allows a picture in a different view to be used as a reference picture. Coding of two views can also be supported by MVC. One of the advantages of MVC, as a result, may be that an encoder using MVC can take more than two views as a 3D video input and a decoder using MVC can decode such a multi-view representation. Thus, a renderer and decoder using MVC can expect 3D video contents with more than two views.

Inter-view prediction may be permitted among pictures in the same access unit, containing the coded pictures of all the views for one output time instance. Thus, in the case of coding a picture in a non-base view, a picture may be added into a reference list in one or more different positions if the picture is within a different view and at the same time instance as another picture.

In the example of constructing a reference list for a B picture, for instance, the construction process can involve two steps. First, the reference list can be initialized. Reference list initialization may be a mechanism for placing reference pictures in a reference picture memory, for example such as decoded picture buffer 114 of FIG. 2 or reference picture memory 160 of FIG. 3, in a list according to the order of a POC (Picture Order Count) value. The POC can be aligned with display order of a picture. Second, the reference list can be reordered. Reference list reordering can involve modifying the position of a picture in a reference list or placing a reference picture in the reference picture memory in a particular position although the picture may not belong to the initialized reference list. Some pictures after reference list reordering may be considered placed in a position in the final reference list. However, in some cases, if a position of a picture exceeds the number of active reference pictures of the list, a picture may not considered as an entry of the final reference list. A number of active reference pictures of may be signaled in the slice header for each list. Once the reference lists are constructed, a reference index can be used to identify the picture in the reference lists.

A Temporal Motion Vector Predictor (TMVP) can be determined in HEVC by accessing a motion vector of a picture in a decoded picture buffer, such as a reference list. In one example implementation, when the TMVP is enabled for an entire coded video sequence, an "sps_temporal_mvp_enable_flag" in a sequence parameter set can be set to 1. A "slice_temporal_mvp_enable_flag" can then further signal in a slice header whether TMVP is enabled for a particular slice. When TMVP is enabled for a particular slice, a "collocated_from_l0_flag" can be used to signal in the slice header whether a co-located picture is from a reference list, such as list 0 or list 1. After a reference list is identified, a "collocated_ref_idx" may be signaled in the slice header to identify the picture in the picture in the list. A co-located PU may be identified by checking the co-located picture, and either the motion of a right-bottom PU of the CU containing this PU, or the motion of the right-bottom PU within the center PUs of the CU containing this PU can be used.

Figure 4:
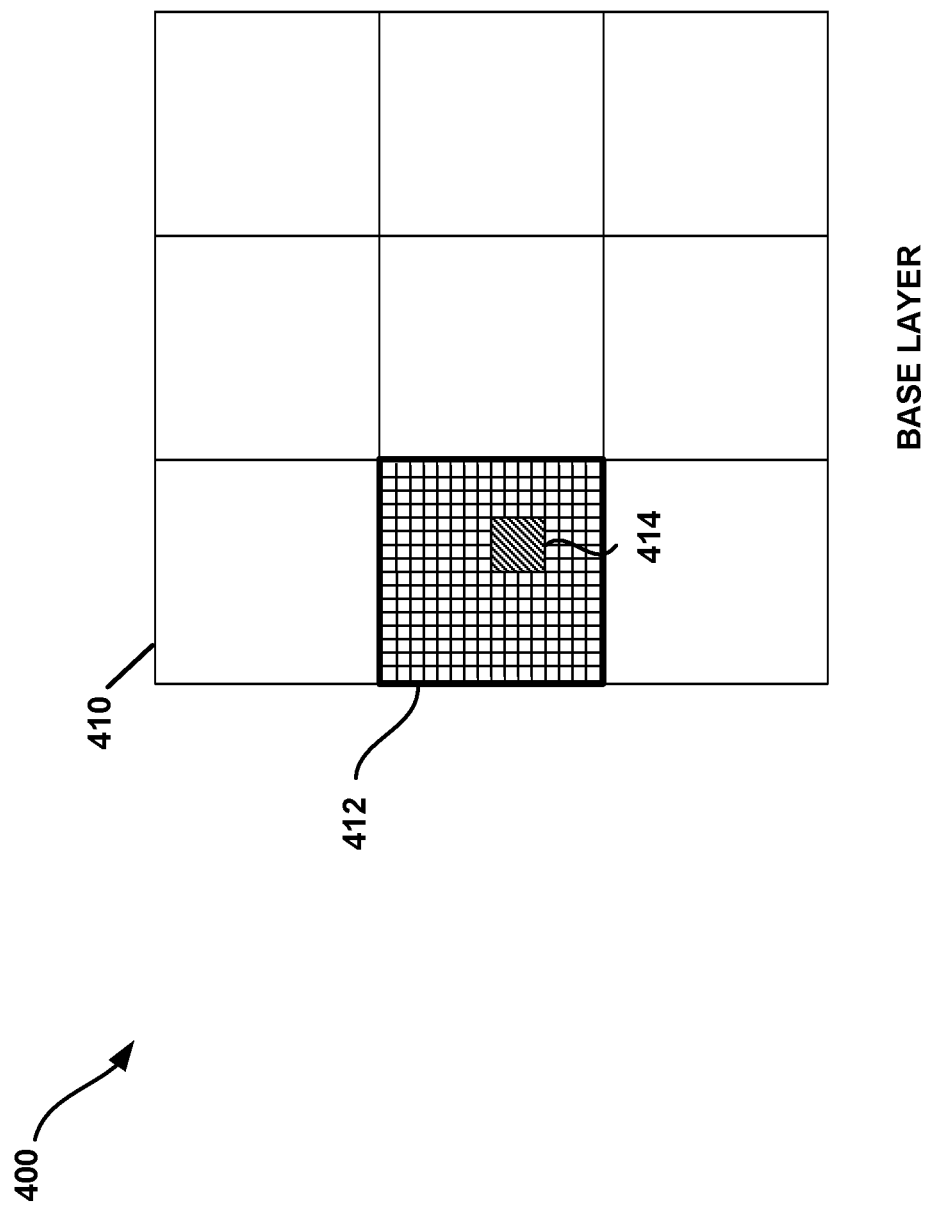
FIG. 4 is a conceptual diagram illustrating example video data usable for prediction of an enhancement layer.

Moving now to FIG. 4, FIG. 4 is a conceptual diagram illustrating example video data 400 usable for prediction of an enhancement layer. The video data 400 includes base layer blocks 410, such as a highlighted based layer block 412, and prediction mode information (not shown) associated with the base layer blocks 410. The prediction mode information includes non-pixel information associated with the samples of the base layer blocks 410 and is usable for the purpose of video compression. Such non-pixel information can include, but is not limited to, prediction mode information like intra prediction mode, inter prediction mode, syntaxes, motion vectors, reference indices, and inter directions (e.g., uni-L0-direction, urn-L1-direction, or bi-direction).

The base layer blocks 410 are each 16×16 sample blocks in the example of FIG. 4. Each sample of the highlighted base layer block 412 is shown in FIG. 4. The prediction mode information associated with the highlighted base layer block 412, in turn, can be stored with a resolution corresponding to 4×4 samples of the highlighted base layer block 412. For instance, one set of prediction mode information may store prediction mode information associated with the highlighted 4×4 sample sub-block 414 of the highlighted base layer block 412 while other sets of prediction mode information may individually store prediction mode information associated with other 4×4 sample sub-blocks of the highlighted base layer block 412. These block sizes and corresponding prediction mode information resolutions of FIG. 4 are provided as illustrative examples. In some embodiments, the base layer blocks 410 can include more samples (e.g., 32×32 samples or 64×64 samples) or fewer samples (e.g., 4×4 samples or 8×8 samples), and the prediction mode information for the highlighted base layer block 412 can have a resolution corresponding to more samples (e.g., 8×8 samples) or fewer samples (e.g., 2×2 or 1×1 samples) of the highlighted base layer block 412.

Figure 5:
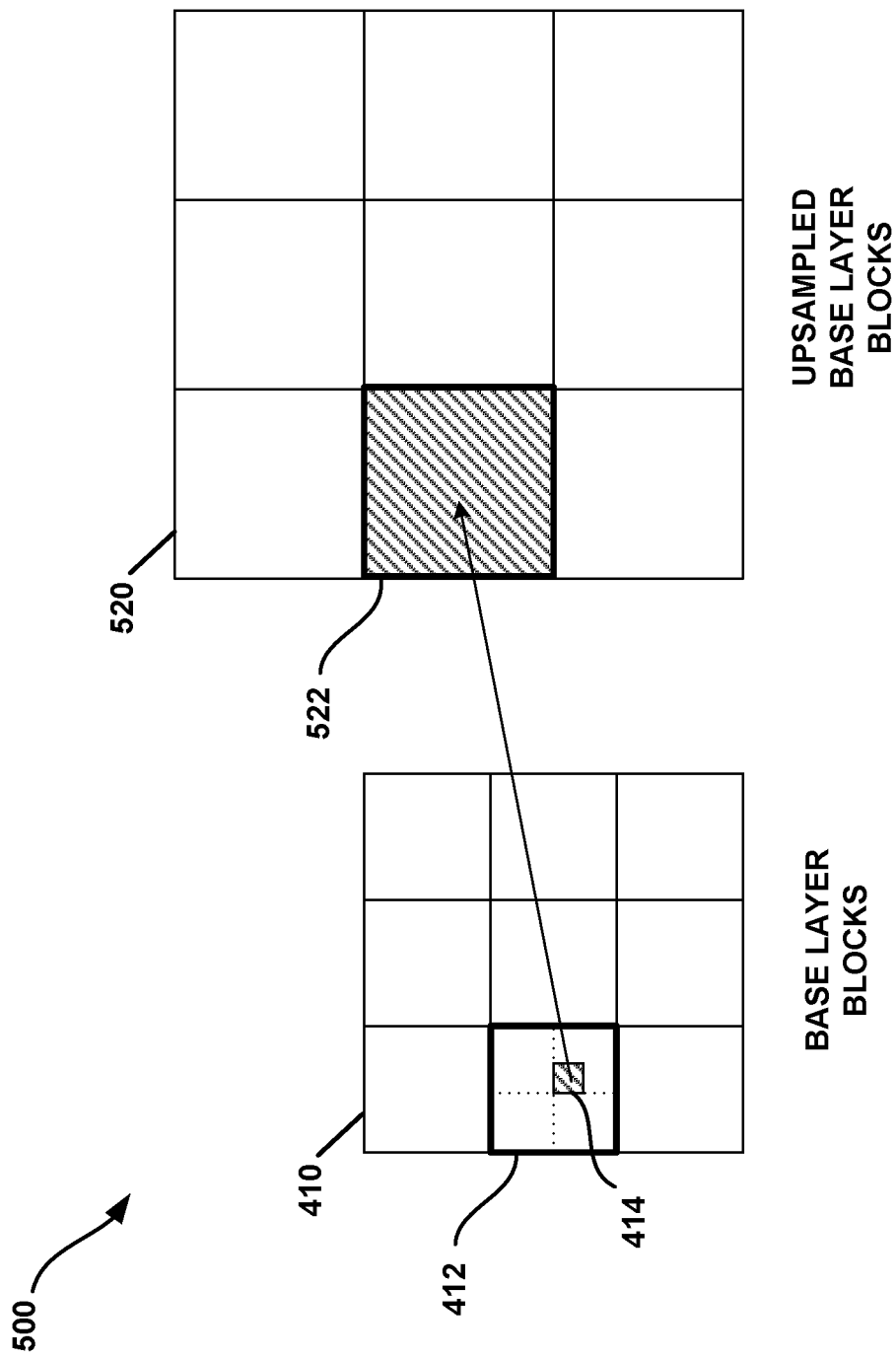
FIGS. 5 and 6 are conceptual diagrams that illustrate example base layer video data and upsampled base layer video data.

Referring to FIG. 5, FIG. 5 is a conceptual diagram 500 that illustrates example base layer video data and upsampled base layer video data. The conceptual diagram 500 includes upsampled base layer blocks 520 and the base layer blocks 410.

The upsampled base layer blocks 520 may be determined by upsampling the base layer blocks 410 according to a spatial aspect ratio, such as the spatial aspect ratio between an enhancement layer and the base layer of the video data. The individual blocks of the base layer blocks 410 when upsampled thus have a corresponding upsampled block which contains a scaled or resampled version of the individual blocks. For example, the highlighted upsampled base layer block 522 can correspond to the highlighted base layer block 412 and be determined by upsampling the highlighted base layer block 412.

The prediction mode information associated with the base layer blocks 410 can also be upsampled and associated with the upsampled base layer blocks 520. The upsampling of the prediction mode information can match the upsampling of the base layer blocks 520, so the prediction mode information is upsampled according to the same spatial aspect ratio used to upsample the base layer blocks 410. In some implementations, the spatial resolution of the upsampled prediction mode information can further depend on a block size used for downsampling of certain prediction mode information, such as motion information.

In some embodiments, the prediction mode information associated with one or more base layer blocks (e.g., only one base layer block) can be used to determine the upsampled prediction mode information associated with an entire upsampled base layer block. For example, the prediction mode information associated with the highlighted 4×4 sample sub-block 414 can be upsampled and assigned as the prediction mode information associated with the highlighted upsampled base layer block 522. Such an approach advantageously can (1) limit or reduce an amount of prediction mode information associated with highlighted upsampled base layer block 522 and stored for use in inter-prediction coding and (2) utilize existing implementations of a codec for single layer coding without implementing block level changes. In one implementation, the prediction mode information along with upsampled pixel information can be stored in a generated inter-layer picture. This inter-layer picture can be the upsampled version of the base layer picture and a newly generated picture having a spatial resolution that matches the spatial resolution of the enhancement layer picture. After derivation, the inter-layer picture may include the same information as a temporal reference picture and may be added to a reference picture list and used for inter-prediction of the enhancement layer. The size of the enhancement layer block can further be selected according to the prediction mode information storage defined by an enhancement layer codec used in the coding. For instance, in motion information subsampling in the HEVC standard, one set of prediction mode information can be stored on a 16×16 samples basis. To be compliant with the HEVC standard without introducing changes at the block level and beyond the slice level, the granularity at which the prediction mode information is stored in the inter-layer picture may be at least 16×16 samples.

Along with this approach, one or more different selection rules can be used to select prediction mode information to be upsampled and associated with an upsampled base layer block. The different selection rules can provide alternative or composite rules for selecting the prediction mode information. One example selection rule can provide that a location of a base layer sub-block (e.g., the highlighted 4×4 sample sub-block 414) associated with particular prediction mode information may be used for selecting or deriving prediction mode information. The sub-block location for this selection rule can, for instance, denote a particular corner sub-block like the bottom-left or top-right corner sub-block of the base layer block, or a center sub-block like the top-left or bottom-right center sub-block of the base layer block. In the example of FIG. 5, the prediction mode information associated with the highlighted 4×4 sample sub-block 414 may be selected based on a bottom-right center sub-block location selection rule. Another example selection rule can provide that values of prediction mode information are used to select the prediction mode information. For instance, the values of motion vectors of prediction mode units may be compared, and the prediction mode information associated with the motion vector having a highest or lowest total or average value can be selected. One or more selection rules can be signaled as a syntax element or a flag stored in a header (e.g., a Video Parameter Set, Sequence Parameter Set, Picture Parameter Set, or slice header) or elsewhere or determined according to default set of rules depending on the implementation.

Additionally, when one or more selection rules are applied, some prediction mode information associated with a base layer block may not be upsampled in some cases because this portion of the information may not depend on the spatial ratio as does, for example, a motion vector. Accordingly, particular prediction mode information can be derived based on a selection rule and then upsampled before being associated with an upsampled base layer block. In other embodiments, the prediction mode information associated with the base layer block can be first upsampled and then, according to a selection rule, particular upsampled prediction mode information can be derived and associated with an upsampled base layer block. Furthermore, the prediction mode information can be downsampled before or after the upsampling process in some implementations.

An upsampled base picture including upsampled base layer blocks, such as the highlighted upsampled base layer block 522, can be placed in one or more enhancement layer reference picture lists as part of a base layer reconstructed picture or as a newly generated picture (e.g., an inter-layer picture) and used for prediction of the enhancement layer. The base layer reconstructed picture or the inter-layer reference picture can be added to or replace another picture in the one or more reference lists. The upsampled prediction mode information associated with the upsampled base layer block can be used for inter-layer motion prediction of the enhancement layer. More than one base layer picture having different block upsamplings and/or prediction mode upsamplings can be added to the one or more reference lists. The different block upsamplings and/or prediction mode upsamplings can be indicated or marked using a syntax element or flag. In certain embodiments, the syntax element or flag can indicate that at least one of a block or prediction mode upsampling differs from a default upsampling.

In certain embodiments, to avoid issues related to assigning prediction mode information to a base layer picture inserted as a reference, a base layer picture may not be used as a co-located reference picture (e.g., a "collocated_ref_idx" parameter may not be equal to the reference index of the base layer picture in the enhancement layer reference list). The reference list in such implementations can be set to list 0, list 1, or both lists 0 and 1. The reference list can further be defined by a "collocated_from_l0_flag" parameter indicating whether a co-located picture used for temporal motion vector prediction is derived from list 0 or list 1. Furthermore, a TMVP can be marked as unavailable if a co-located reference index points to the base layer reference picture (e.g., one or more TMVP flags may indicate that TMVP is turned off, such as a "sps_temporal_mvp_enable_flag" or "slice_temporal_mvp_enable_flag" parameter may be indicated to be off).

In some embodiments, if a base layer picture is inserted into an enhancement layer reference picture list as a P-slice, the prediction mode information for inter prediction may be designated for list 0, but not for list 1. On the other hand, if the base layer picture is inserted as a B-slice, the prediction mode information for inter prediction may be designated for lists 0 and 1. However, even when the prediction mode information associated with a base layer block is uni-directional, the prediction mode information can be made to be bi-directional as part of an upsampling process for prediction mode information. In one example approach, a uni-directional motion vector is scaled from list 0 to then be used for the list 1 with a particular reference index (e.g., zero or one). In another example, uni-directional prediction mode information is supplemented with zero motion or other default motion information. Furthermore, even for B-slice, a uni-directional motion field can be used for list 0 or list 1.

Figure 6:
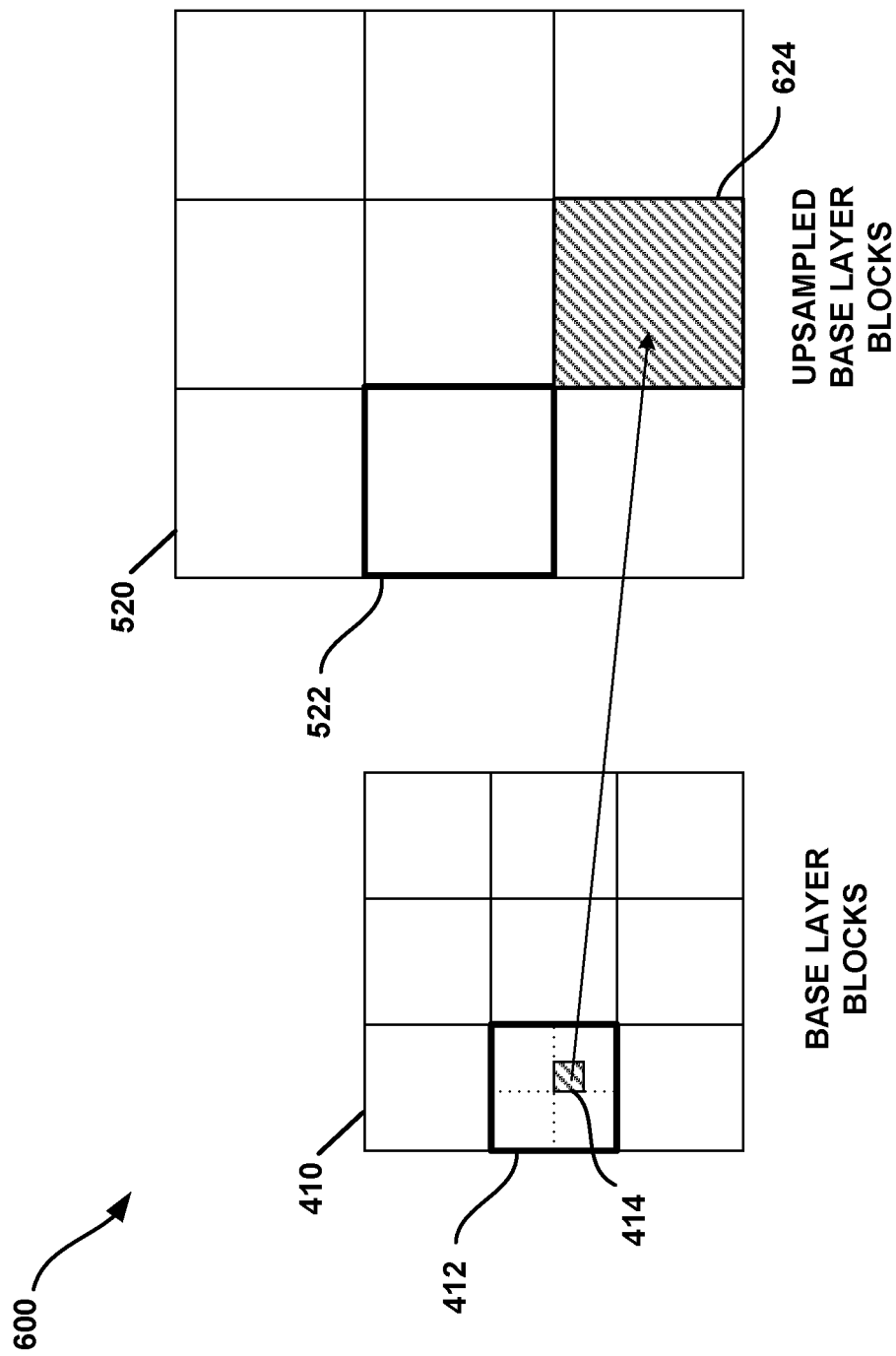

FIG. 6 is a conceptual diagram 600 that illustrates example base layer video data and upsampled base layer video data. The highlighted base layer block 412 is located at a position in the base layer corresponding to the position of the highlighted upsampled base layer block 522, which is a neighboring block of the highlighted upsampled base layer block 624 in the upsampled base layer. FIG. 6 is similar to FIG. 5, however, the prediction mode information associated with the highlighted 4×4 sample sub-block 414 may be upsampled and, additionally or alternatively, assigned as the prediction mode information associated with the highlighted upsampled base layer block 624. That is, the highlighted 4×4 sample sub-block 414 can be located differently relative to an upsampled base layer block than shown in FIG. 5 and may not be a co-located block to the upsampled base layer block. In some embodiments, the prediction mode information from the prediction mode unit 422 can additionally or alternatively be assigned to one or more other upsampled base layer blocks, such as other neighboring or adjacent blocks of the co-located highlighted upsampled base layer block 522 or the highlighted upsampled base layer block 624.

Figure 7:
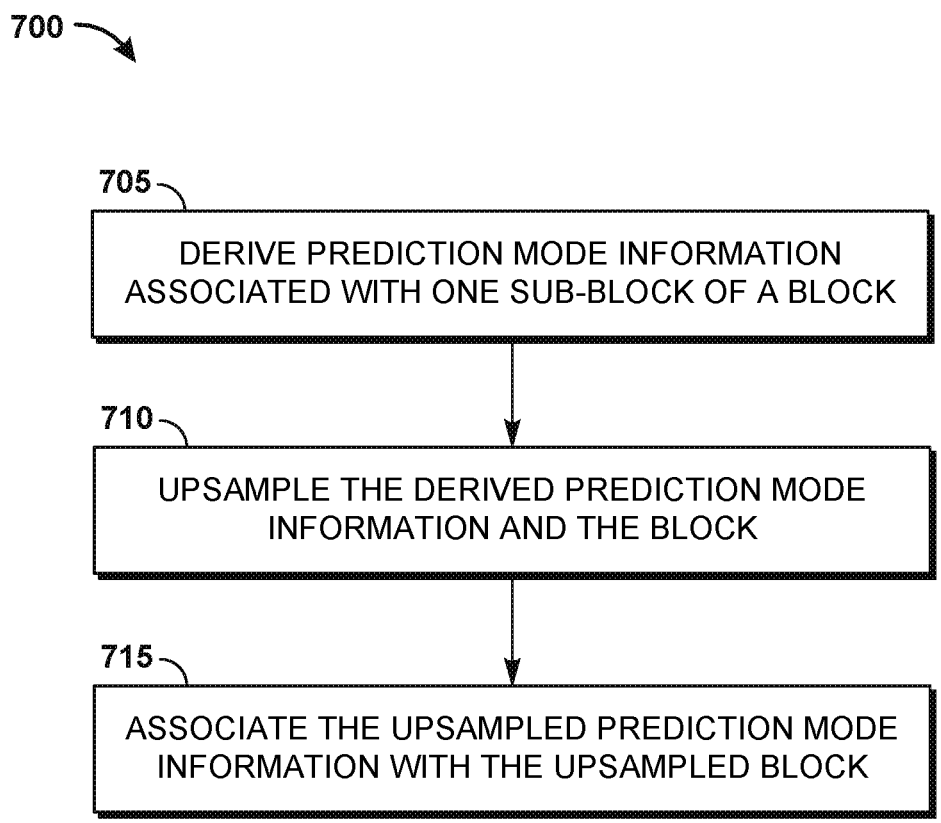
FIG. 7 illustrates an example method for coding video data.

FIG. 7 illustrates an example method 700 for coding video data. The method 700 can be performed by one or more components of video encoder 20 or video decoder 30, including inter prediction module 121, upsampling module 130, motion compensation unit 162, or upsampling module 170. In some embodiments, other components may be used to implement one or more of the steps described herein. The method 700 can be used to perform one or more of the actions described with respect to FIGS. 4-6, for example.

At node 705, prediction mode information associated with one of multiple sub-blocks of a video block in a base layer is derived using at least a selection rule. The prediction mode information can include intra prediction mode, inter prediction mode, motion information, or the like associated with the video block and may be used for video compression of the video block. The prediction mode information associated with the video block may be stored with a resolution corresponding to 4×4 samples of the video block. In some embodiments, the prediction mode information associated with a particular sub-block of the video block (e.g., the bottom-right center sub-block) is selected and derived according to the selection rule. The particular prediction mode unit may additionally or alternatively be indicated and determined based on a syntax element or flag or a default set of rules.

At node 710, the derived prediction mode information and the video block are upsampled. The prediction mode information, for example, can be upsampled according to a spatial aspect ratio between an enhancement layer and a base layer of video content in some implementations.

At node 715, the upsampled prediction mode information is associated with each upsampled sub-block of the upsampled video block. The upsampled prediction mode information and upsampled video block can, in turn, be together used for predicting video blocks (e.g., sample values) in the enhancement layer. In certain embodiments, a video block in the enhancement layer may be co-located with the video block in the base layer so that the video block in the base layer is located at a position in the base layer corresponding to the position of the video block in the enhancement layer. Alternatively, a video block in the base layer can be located at a position in the base layer corresponding to the position of a neighboring video block to the video block in the enhancement layer. In one example, the neighboring video block may be positioned adjacent to the video block in the enhancement layer.

Additionally or alternatively to the method 700, default prediction mode information can be associated with an upsampled base layer block and/or picture rather than upsampled prediction mode information in some embodiments. For example, zero motion can be associated with an upsampled base layer block such that a motion vector and a reference index associated with the upsampled base layer block are set to zero. In another example, prediction mode information associated with an upsampled base layer block can be marked as unavailable by setting an associated reference index to minus one. The default prediction mode information in such cases can be set to list 0, list 1, or both lists 0 and 1.

Moreover, default prediction mode information may be associated with an upsampled base layer block and/or picture under certain conditions but not others, such as according to an assignment rule. For example, default prediction mode information can be used when a TMVP target reference picture references a co-located picture (e.g., a TMVP reference index equals a co-located reference index), and not used when the TMVP target reference picture does not reference a co-located picture. In another example, default prediction mode information can depend on a coding used to compress a base layer. For instance, default prediction mode information can be used if a base layer is coded using a codec other than HEVC, such as H.264/AVC or MPEG-2, and not used if the base layer is coded using an HEVC codec. Such an approach advantageously can avoid extracting base layer syntaxes when extracting the base layer syntaxes may be difficult given the codec used to compress the base layer.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques can be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

In still other examples, this disclosure may be directed to a computer readable medium that stored compressed video content, wherein the video content is compressed according to one or more of the techniques described herein.

Various examples have been described. These and other examples are within the scope of the following claims.

What is claimed is:

1. An apparatus configured to code video data, the apparatus comprising:
   a memory unit configured to store video data associated with a base layer having a first spatial resolution and an enhancement layer having a second spatial resolution greater than the first spatial resolution, the video data associated with the base layer including at least a base layer block and base layer prediction mode information associated with the base layer block, the base layer block including a plurality of sub-blocks where each sub-block is associated with respective prediction mode data of the base layer prediction mode information, the respective prediction mode data including non-pixel information; and
   a processor implemented in circuitry and in communication with the memory unit, the processor being configured to:
      upsample pixel data of a picture of the base layer to form an inter-layer picture comprising a plurality of blocks, the inter-layer picture having the second spatial resolution associated with the enhancement layer and being usable for inter-prediction of one or more pictures of the enhancement layer;
      for every respective block of the inter-layer picture:
         identify a single sub-block of the base layer block corresponding to the respective block of the inter-layer picture, the identified sub-block neighbored on each side by a respective sub-block of the plurality of sub-blocks of the base layer block;
         select respective prediction mode data associated with the identified sub-block of the plurality of sub-blocks of the base layer block;
         upsample the selected respective prediction mode data associated with the identified sub-block of the plurality of sub-blocks of the base layer block; and
         associate the upsampled prediction mode data with the respective block of the inter-layer picture;
      add the inter-layer picture to a reference picture list, pictures within the reference picture list being usable for inter-prediction of the enhancement layer having the second spatial second resolution;
      inter-predict a first block of a first picture of the one or more pictures of the enhancement layer from the inter-layer picture to form a predicted block for the first block, wherein to predict the first block, the processor is configured to code a reference index of the first block, the reference index identifying the inter-layer picture in the reference picture list; and
      predict prediction mode data of a second block of a second picture of the one or more pictures of the enhancement layer using the upsampled prediction mode data of the inter-layer picture of the reference picture list.

2. The apparatus of claim 1, wherein every respective block of the inter-layer picture has a fixed size.

3. The apparatus of claim 1, wherein the processor is further configured to determine a predicted value of an enhancement layer block in the enhancement layer based at least on the inter-layer picture being added to the reference picture list.

4. The apparatus of claim 3, wherein the base layer block is located at a position in the base layer corresponding to a position of the base layer block in the base layer.

5. The apparatus of claim 3, wherein the base layer block is located at a position in the base layer corresponding to the position of a neighboring enhancement layer block positioned adjacent to the enhancement layer block in the second layer.

6. The apparatus of claim 1, wherein a spatial resolution ratio between the upsampled prediction mode data and the selected respective prediction mode data matches a spatial resolution ratio between the second spatial resolution and the first spatial resolution.

7. The apparatus of claim 1, wherein the non-pixel information comprises at least one of an intra prediction mode, an inter prediction mode, motion information, a reference index, or an inter direction that is usable for compressing the video data.

8. The apparatus of claim 1, wherein the processor comprises a decoder or an encoder.

9. The apparatus of claim 1, wherein the apparatus comprises at least one of a computer, a tablet computer, a set-top box, a telephone handset, a smart phone, a smart pad, a television, a camera, a display device, a digital media player, a video gaming console, an in-car computer or a wireless communication device.

10. A method of coding video data, the method comprising:
storing video data associated with a base layer having a first spatial resolution and an enhancement layer having a second spatial resolution greater than the first spatial resolution in a memory unit, the video data associated with the base layer including at least a base layer block and base layer prediction mode information associated with the base layer block, the base layer block including a plurality of sub-blocks where each sub-block is associated with respective prediction mode data of the base layer prediction mode information, the respective prediction mode data including non-pixel information;
upsampling, by a processor in communication with the memory unit, pixel data of a picture of the base layer to form an inter-layer picture comprising a plurality of blocks, the inter-layer picture having the second spatial resolution associated with the enhancement layer and being usable for inter-prediction of one or more pictures of the enhancement layer;
for every respective block of the inter-layer picture:
identifying, by the processor, a single sub-block of the base layer block corresponding to the respective block of the inter-layer picture, the identified sub-block neighbored on each side by a respective sub-block of the plurality of sub-blocks of the base layer block;
selecting, by the processor, respective prediction mode data associated with the identified sub-block of the plurality of sub-blocks of the base layer block;
upsampling, by the processor, the selected respective prediction mode data associated with the identified sub-block of the plurality of sub-blocks of the base layer block; and
associating, by the processor, the upsampled prediction mode data with the respective block of the inter-layer picture;
adding, by the processor, the inter-layer picture to a reference picture list, pictures within the reference picture list being usable for inter-prediction of the enhancement layer having the second spatial second resolution;
inter-predicting a first block of a first picture of the one or more pictures of the enhancement layer from the inter-layer picture to form a predicted block for the first block, wherein inter-predicting the first block comprises coding a reference index of the first block, the reference index identifying the inter-layer picture in the reference picture list; and
predicting prediction mode data of a second block of a second picture of the one or more pictures of the enhancement layer using the upsampled prediction mode data of the inter-layer picture of the reference picture list.

11. The method of claim 10, further comprising determining a predicted value of an enhancement layer block in the enhancement layer based at least on the inter-layer picture being added to the reference picture list, the base layer block being located at a position in the base layer corresponding to the position of the enhancement layer block in the enhancement layer or located at the position in the base layer corresponding to the position of a neighboring enhancement layer block positioned adjacent to the enhancement layer block in the enhancement layer.

12. The method of claim 10, wherein a spatial resolution ratio between the upsampled prediction mode data and the selected respective prediction mode data matches a spatial resolution ratio between the second spatial resolution and the first spatial resolution.

13. The method of claim 10, wherein every respective block of the inter-layer picture has a fixed size.

14. The method of claim 10, wherein the non-pixel information comprises at least one of an intra prediction mode, an inter prediction mode, a motion information, a reference index, or an inter direction that is usable for compressing video data.

15. An apparatus configured to code video data, the apparatus comprising:
means for storing video data associated with a base layer having a first spatial resolution and an enhancement layer having a second spatial resolution greater than the first spatial resolution, the video data associated with the base layer including at least a base layer block and base layer prediction mode information associated with the base layer block, the base layer block including a plurality of sub-blocks where each sub-block is associated with respective prediction mode data of the base layer prediction mode information, the respective prediction mode data including non-pixel information; and
means for upsampling pixel data of a picture of the base layer to form an inter-layer picture comprising a plurality of blocks, the inter-layer picture having the second spatial resolution associated with the enhancement layer and being usable for inter-prediction of one or more pictures of the enhancement layer;
means for identifying, for every respective block of the inter-layer picture, a single sub-block of the base layer block corresponding to the respective block of the inter-layer picture, the identified sub-block neighbored on each side by a respective sub-block of the plurality of sub-blocks of the base layer block;
means for selecting, for every respective block of the inter-layer picture, respective prediction mode data associated with the identified sub-block of the plurality of sub-blocks of the base layer block;
means for upsampling, for every respective block of the inter-layer picture, the selected respective prediction mode data associated with the identified sub-block of the plurality of sub-blocks of the base layer block;
means for associating, for every respective block of the inter-layer picture, the upsampled prediction mode data with the respective block of the inter-layer picture;

means for adding the inter-layer picture to a reference picture list, pictures within the reference picture list being usable for inter-prediction of the enhancement layer having the second spatial second resolution;

means for inter-predicting a first block of a first picture of the one or more pictures of the enhancement layer from the inter-layer picture to form a predicted block for the first block, wherein the means for inter-predicting the first block comprises means for coding a reference index of the first block, the reference index identifying the inter-layer picture in the reference picture list; and means for predicting prediction mode data of a second block of a second picture of the one or more pictures of the enhancement layer using the upsampled prediction mode data of the inter-layer picture of the reference picture list.

16. The apparatus of claim 15, wherein every respective block of the inter-layer picture has a fixed size.

17. The apparatus of claim 15, further comprising means for determining a predicted value of an enhancement layer block in the enhancement layer based at least on the inter-layer picture added to the reference picture list, the base layer block being located at a position in the base layer corresponding to the position of the enhancement layer block in the enhancement layer or located at the position in the base layer corresponding to the position of a neighboring enhancement layer block positioned adjacent to the enhancement layer block in the second layer.

18. The apparatus of claim 15, wherein the non-pixel information comprises at least one of an intra prediction mode, an inter prediction mode, a motion information, a reference index, or an inter direction that is usable for compressing the video data.

19. A non-transitory computer storage that stores executable program instructions that, when executed, direct an apparatus for coding video data to perform a process that comprises:

storing video data associated with a base layer having a first spatial resolution and an enhancement layer having a second spatial resolution greater than the first spatial resolution in a memory unit, the video data associated with the base layer including at least a base layer block and base layer prediction mode information associated with the base layer block, the base layer block including a plurality of sub-blocks where each sub-block is associated with respective prediction mode data of the base layer prediction mode information, the respective prediction mode data including non-pixel information;

upsampling, by a processor in communication with the memory unit, pixel data of a picture of the base layer to form an inter-layer picture comprising a plurality of blocks, the inter-layer picture being usable for inter-prediction of one or more pictures of the enhancement layer;

for every respective block of the inter-layer picture:

identifying a single sub-block of the base layer block corresponding to the respective block of the inter-layer picture, the identified sub-block neighbored on each side by a respective sub-block of the plurality of sub-blocks of the base layer block;

selecting respective prediction mode data associated with the identified sub-block of the plurality of sub-blocks of the base layer block;

upsampling the selected respective prediction mode data associated with the identified sub-block of the plurality of sub-blocks of the base layer block; and associating the upsampled prediction mode data with the respective block of the inter-layer picture;

adding the inter-layer picture to a reference picture list, pictures within the reference picture list being usable for inter-prediction of the enhancement layer having the second spatial second resolution;

inter-predicting a first block of a first picture of the one or more pictures of the enhancement layer from the inter-layer picture to form a predicted block for the first block, wherein inter-predicting the first block comprises coding a reference index of the first block, the reference index identifying the inter-layer picture in the reference picture list; and predicting prediction mode data of a second block of a second picture of the one or more pictures of the enhancement layer using the upsampled prediction mode data of the inter-layer picture of reference picture list.

20. The non-transitory computer storage of claim 19, wherein the process further comprises determining a predicted value of an enhancement layer block in the enhancement layer based at least on the inter-layer picture added to the reference picture list, the base layer block being located at a position in the base layer corresponding to the position of the enhancement layer block in the enhancement layer or located at the position in the base layer corresponding to the position of a neighboring enhancement layer block positioned adjacent to the enhancement layer block in the enhancement layer.

21. The non-transitory computer storage of claim 19, wherein the non-pixel information includes an intra prediction mode information, an inter prediction mode information, a motion information, a reference index, or an inter direction that is usable for compressing the video data.

22. The method of claim 10, wherein storing the base layer prediction mode information comprises storing the base layer prediction mode information at a granularity of at least 16×16 samples.

* * * * *